Sept. 27, 1966   P. C. TABOR   3,275,357
SEAT SPRING END CONNECTION TO FRAME
Filed Sept. 20, 1965   2 Sheets-Sheet 1
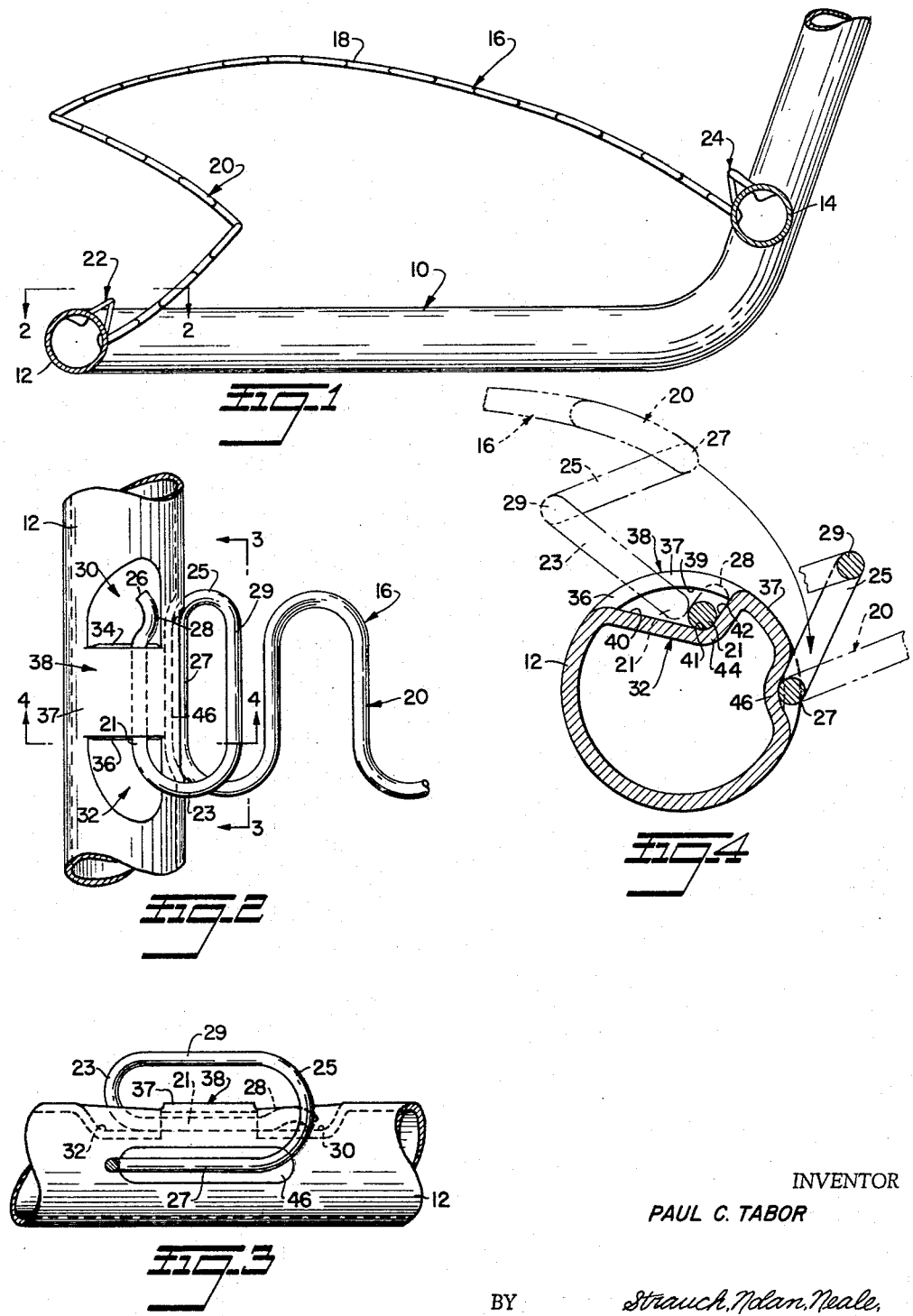
INVENTOR
PAUL C. TABOR
BY Strauch, Nolan, Neale,
Nies & Bronaugh
ATTORNEYS Sept. 27, 1966 P. C. TABOR 3,275,357
SEAT SPRING END CONNECTION TO FRAME
Filed Sept. 20, 1965 2 Sheets-Sheet 2
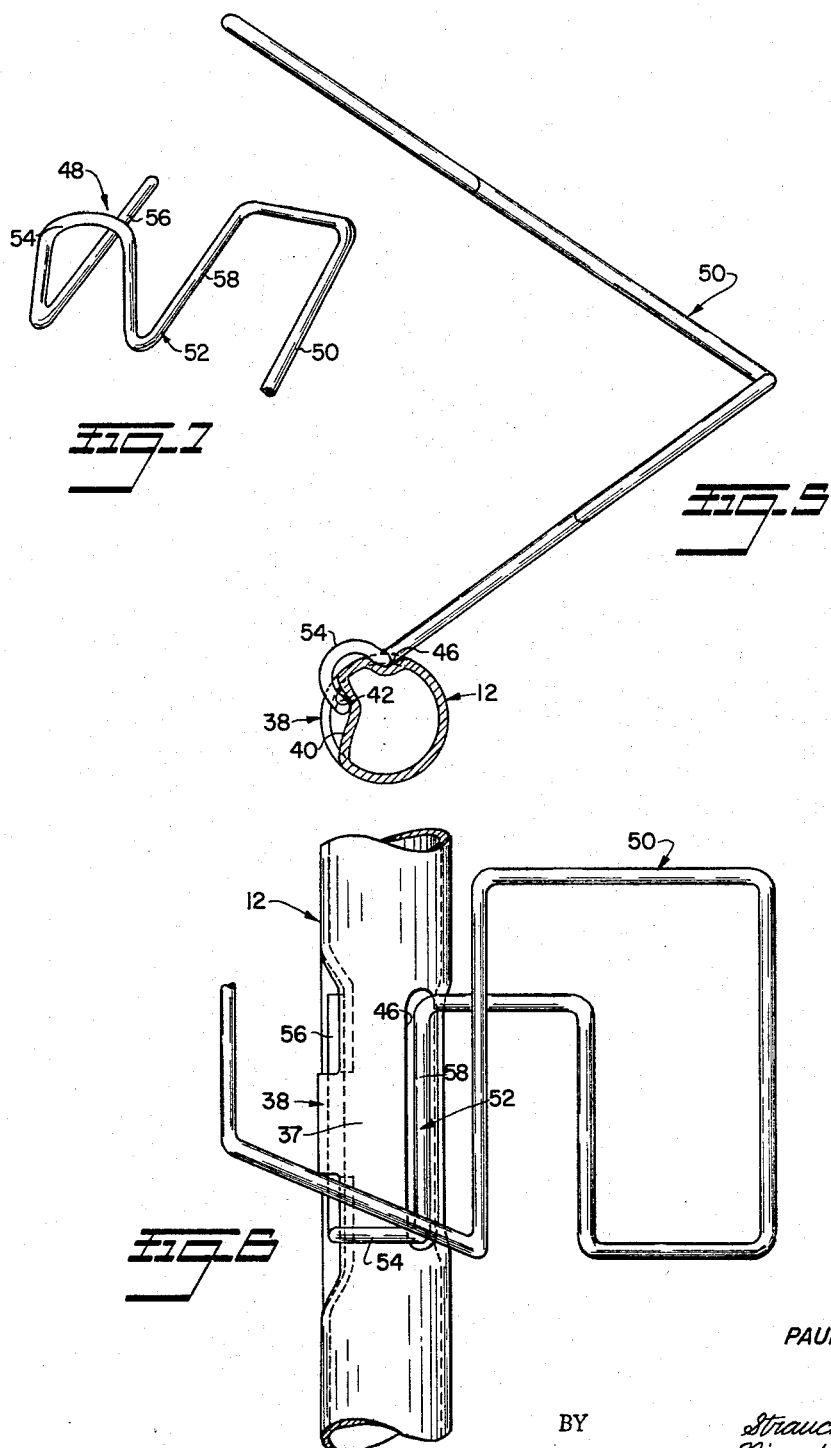
INVENTOR
PAUL C. TABOR
BY Strauch, Nolan, Neale,
Nies & Bronaugh
ATTORNEYS _United States Patent Office_  3,275,357
Patented Sept. 27, 1966

3,275,357
SEAT SPRING END CONNECTION TO FRAME
Paul C. Tabor, Clawson, Mich., assignor to Rockwell-Standard Corporation, Pittsburgh, Pa., a corporation of Delaware
Filed Sept. 20, 1965, Ser. No. 488,516
12 Claims. (Cl. 287—189.36)

The present invention refers to seat construction particularly for automobiles and more specifically to a terminal end connection structure for connecting spring members such as substantially flat formed or sinuous wire spring strips to tubular seat frame members.

Prior to the invention it was common practice to attach the terminal ends of such flat spring members to tubular frame members by separate clip elements which had to be welded or otherwise secured to the frame members at added expense and increased assembly time. In other prior structures the ends of such spring members are secured to tubular frame members by providing holes or slots cut out or punched in the frame members wherein the hooked ends of the flat spring members are inserted. Such arrangements require specially shaped end loops or hooks on the spring members which are difficult and expensive to produce with conventional spring forming machines.

In another proposed arrangement special slots are formed in the tubular frame members to receive the hooked end loops of the spring elements. The lengths of such slots are slightly less than the dimension across two parallel legs of the end loop, so that the end loop can be snapped into the slot and retained therein by the outwardly directed spring force of its opposite legs. This arrangement requires precision manufacture of both the spring ends and the frame member slots to assure proper fit for a rigid snap-action lock sufficient to withstand varying load applications to which a seat cushion is usually subjected. It also requires working to close tolerances since any larger tolerances normally encountered in the manufacture of this type of article results in an objectionable loose connection that is unsafe in vehicles.

All prior art terminal connections of this kind (only a few of which have been described in the foregoing and of which U.S. Patents No. 2,440,001 to Blumensaadt; No. 2,842,188 to Hupp and No. 3,156,461 to Caughey are representative) have a common representative fault in that they are subject to extreme wear because of friction in the retaining connection between the spring strip end and the tubular frame member since the terminals tend to rub against the frame member during load application. As the terminal attachments become more loose, objectionable squeaking noises appear. Similar objectionable wearing effects may be caused by the portions of the wire spring adjacent the attaching end loop which abut and rub on the frame surface during movement.

The major disadvantage in such prior art structures is that the terminal connections are subject to the entire load placed on the spring and thus the terminal connections may be overstressed to cause early failure, and it is a major object of the present invention to avoid this disadvantage.

Also these known structures which remove metal to provide holes or slots in the frame member thus considerably locally weaken the frame member, and the bending stresses which can be imposed on a slotted or punched tubular frame member must be considerably less and cannot always be controlled. Consequently for some structures the wall section of a slotted or punched tubular frame member has to be made thicker than a comparable tubular frame member which is not so slotted or pierced. This increased thickness is objectionable in that it adds to the weight and cost of the seat structure.

The present invention has for a major object a novel terminal connection for attaching a preformed flat sinuous or formed wire spring strip to a tubular seat or like frame member which eliminates substantially all of the aforesaid disadvantages of the prior art.

Accordingly, it is an important object of the invention to provide a novel stress distributed connection structure between a tubular seat frame member and the end of a relatively flat preformed wire spring member.

Another object of the invention resides in a novel interconnection between a hollow tubular seat frame member and the end of a preformed flat sinuous or like wire member comprising a spring end retainer connection subject to little or no load stress and an adjacent load bearing connection.

A further object of the invention is to provide a novel connection between a hollow tubular seat frame member and a preformed flat sinuous or like spring member comprising a coacting bridge and depression formation on the frame member receiving and retaining the end of the spring member and an angularly disposed load bearing surface depression on the frame member seating an adjacent portion of the spring member.

Another object of the invention is to provide an improved end attachment means to secure a flat preformed wire spring member to a tubular seat frame comprising a sheared capsule integral with the tube wall having adjacent depressions of varying depths from the outer surface of the tube to the deepest points in the depression which cooperate with a shaped spring end to securely retain the spring end within the capsule and prevent its working loose or removal when the spring is in its normal load carrying position.

A further object of the invention resides in providing a novel capsule structure in a seat rail such that after insertion the end loop of a preformed spring in the capsule the loop cannot normally work loose or be extracted lengthwise of the tube, but can be detached therefrom only by rotating the wire spring in a direction opposite from the normal direction of load application.

Another object of the invention is the provision of a novel sheared capsule in a tubular seat frame member which is formed to provide a depression of varying depth from the outer surface of the tubular member to the deepest point of the depression, thus providing an interference fit between part of the end loop and the interior of the capsule which effectively prevents accidental or undesired working loose or extraction of the end loop from the capsule.

Still another object of the invention resides in the provision of a novel capsule configuration sheared into the wall of a tubular member for attaching the end of a seat spring in such way that no metal will be removed at any cross section of the tubular member assuring that a uniform cross section area will be maintained throughout the length of the tubular member so as not to adversely affect the section modulus thereof.

A still further object is the provision of a spring end retaining capsule structure formed in a seat frame rail and a cooperating support surface for an adajcent part of the wire spring member in the form of a depression in the tubular seat frame member radially offset from the axial center of the capsule to support the spring immediately adjacent the capsule to thus absorb the main portion of the load applied to the wire spring element and to prevent chafing of the wire spring element on the surface of the tubular frame member.

Various other objects and novel features will be readily apparent from the following detailed description with reference to the accompanying drawings in which:

FIGURE 1 is a side elevation partially in section through a vehicle seat frame showing a formed or sinuous wire spring element attached at opposite ends to a tubular frame member according to a preferred embodiment of the invention;

FIGURE 2 is a fragmentary top plan view of part of such a connection to a tubular frame member taken substantially along arrows 2—2 in FIGURE 1;

FIGURE 3 is a front view partly in section of the structure of FIGURE 2 looking in the direction of arrows 3—3 in FIGURE 2;

FIGURE 4 is a section through the tubular frame member and spring connection substantially on line 4—4 of FIGURE 3;

FIGURE 5 illustrates an alternate embodiment incorporating a formed wire spring rather than a sinuous spring as shown in FIGURES 1–4;

FIGURE 6 is a top plan view of part of the structure of FIGURE 5; and

FIGURE 7 is a detailed view of the spring end structure of FIGURES 5 and 6.

FIGURE 1 illustrates a vehicle seat structure including a tubular frame member 10 to which are rigidly attached as by welding a tubular hollow front rail 12 and rear rail 14. Frame member 10 is suitably rigid with the vehicle body, and rails 12 and 14 are preferably parallel and extend transversely within the vehicle body.

Rails 12 and 14 are adapted to support a sufficient number of preformed sinuously curved or formed wire spring members 16 which extend longitudinally side by side in the vehicle and are each composed of a load resting portion 18 culminating at the front into a V-shaped or "fishmouth" load supporting portion 20. The ends 22 and 24 of each wire spring member 16 at front and rear are formed into a substantial V-shape for attachment to the front rail 12 and rear rail 14 respectively by the special connection structure to be disclosed. Since both ends 22 and 24 and their respective attachments to the tubular rails 12 and 14 are identical, only front end attachment will be specifically described with reference to FIGURES 2, 3 and 4.

End 22 of the preformed wire spring strip member 16 is preferably formed by bending the last two sinuously bent portions 23 and 25 respectively in opposite directions out of the normal horizontal plane of the flat wire spring and about the torsion bar sections 27 and 29 to form a substantially Z configuration shown best in FIGURE 4.

As shown in FIGURE 2, the end tip 26 of the endmost torsion bar 21 is deformed with respect to the axis of the wire to provide an offset portion 28 which as will appear aids in retaining the spring end attached to the rail.

Referring to FIGURES 2 and 3, hollow tubular rail 12 is formed at longitudinally spaced intervals with similar outwardly open wall depressions 30 and 32 allowed to be formed by cutting parallel transverse slits 34 and 36 through the tube wall. The slits permit shearing of the tube wall by pressure exerted on the adjacent tube surfaces by appropriate tools, such as punches, and this forms the surface depressions 30 and 32 extending below the original peripheral surface of the tube. This operation provides a bridge section 37 of the original tube diameter between the depressions 30 and 32 to form with the depressions a capsule 38 which is adapted to receive and retain spring end 21. One capsule 38 is formed for receiving each spring end.

Referring to FIGURE 4, each of depressions 30 and 32 which are preferably identical has a relatively shallow inwardly and downwardly inclined surface 40 which is connected at its inner end by a rounded socket surface 41 to a considerably steeper and short upwardly and outwardly inclined surface 42 extending at substantially right angles to surface 40 and inwardly toward the surface of the tubular rail that lies within the seat confines.

The socket apex 44 within the tube 12 at the intersection of inclined surfaces 40 and 42 is laterally offset a predetermined distance inwardly from the centerline of the tubular rail 12 towards the center of the seat as shown in FIGURES 1 and 4.

Depressions 30 and 32 are deep enough to allow the axial insertion of the end bar 21 of wire spring member 16 into capsule 38 to be retained thereby as shown in FIGURE 2, thus eliminating the necessity of having the capsule expanded out of the normal surface of the tube and thus avoiding weakening the cross section of the tube at that point. As illustrated in FIGURE 4, capsule 38 retains the normal diameter of the tube at bridge 37, and bridge 37 prevents rocking or other lateral displacement of the bar 21 out of the capsule 38.

Approximately 90 degrees angularly offset from the retaining capsule 38 inwardly towards the center of the seat assembly, tubular rail 12 is formed with a further relatively shallow axially elongated surface depression 46 transversely aligned with and substantially parallel to retaining capsule 38. Depression 46 serves as a pivot and load bearing support for the spring end in operation, whereby excessive load and flexure and wire movement at the capsule retained spring end portion will be avoided, thus considerably reducing wear at that point. In addition, depression 46 serves as a locating and holding means when capsule 38 is being formed on the tube.

The shapes of opposed depressions 30 and 32 at capsule 38 is such that when the spring 16 is assembled with tubular rails 12 and 14 in a manner to be described they can not work loose by movements imparted thereto in a direction axially of the rails since in the assembled position as shown in FIGURE 2 the hook deformation 28 at the tip of the spring end prevents the extraction of the spring end from capsule 38 because it becomes wedged between inclined surface 40 and the inner surface 39 of the capsule bridge when the spring end is moved axially of the tube.

With reference to FIGURE 4, in order to attach spring member 16 to rail 12, the spring member must be first turned into a position substantially opposite from its final assembly position, as indicated in phantom lines in FIGURE 4. At this time the end torsion bar 21 is axially inserted into the capsule 38 by sliding the spring end tip 26 foremost axially along the tube through depression 32, under bridge 37 and into depression 30 to reach fully extended position. The shapes of depressions 30 and 32 facilitate such insertion of the spring end into the capsule and since the deformed portion 28 moves straight along the longer inclined surface 40 during insertion there will be no interference between the deformed end and the inner wall surface of the capsule.

After the spring end has been fully inserted into capsule 38, spring member 16 is rotated clockwise in the direction of the arrow of FIGURE 4 into its normal load carrying position of FIGURE 1, this position being shown in full lines in FIGURE 4, whereby the deformed region 28 is turned to abut inclined depression surface 42 as shown in FIGURE 4.

It will be seen in FIGURE 4 that in this position the deformed region projects beyond the inner diameter 39 of the capsule 38, thus making axial displacement of torsion bar 21 and consequently extraction of the spring end from the capsule impossible.

When spring member 16 is in this normal load carrying position on tubular rail 12, an adjacent torsion bar 27 between the end portion 22 and the fishmouth portion 20 is disposed in bearing engagement with the rail within the depression 46. This removes excess load from the end attachment at the capsule and absorbs the larger portion of the torsional movement at the spring end induced by flexure of the spring member during loading and unloading. In addition, any scrubbing or chafing action between the spring end and the tubular rail surface is prevented.

FIGURES 5–7 illustrate the invention as applied to a so-called formed wire spring member structure 51 rather than the more common sinuous shape of FIGURES 1–4.

Rail 12 is essentially the same as in FIGURES 1–4 and is likewise provided along its length with the necessary number of formed capsules 38 having shaped depressions 30 and 32 and bridge 37 to retain the spring end transverse bar 56 and a like number of angularly spaced depressions 46 from capsules 38 to accept an adjacent transverse spring bar 58 and provide load bearing support for the spring at a remote portion from the retained end to relieve the spring end from excessive wear and overload as in FIGURES 1 and 4.

The end portion 48 of formed wire spring 50 is provided with a generally U-shaped loop 52 with the closed end 54 of the loop bent upwards at approximately 90° to the plane of transverse bars 56 and 58 constituting the legs of the loop remaining in the general plane of the flat wire strip 50.

During assembly with the frame, the formed wire spring 50 is held upside down with the end portion 48 pointing towards the rail 12. The straight end bar 56 is then inserted endwise into the capsule 38 beneath bridge 37. Spring 50 is then rotated on rail 12 about the axis of bar 56 into its final forming position which is shown in FIGURES 5 and 6. When spring 50 is in this position, the rounded portion 54 of end loop 52 extends over bridge 57 and spans the outer surface of the rail between capsule 38 and the cooperating depression 46 which receives the opposite straight bar 58, thus relieving the terminal end of excess load and consequent wear and chafing during normal operation.

After the spring is assembled in this manner as shown in FIGURES 5 and 6 it is not possible to remove the spring by longitudinal movement along the rail 12 since both bars 56 and 58 constituting legs of end loop 52 are disposed and held below the normal surface of the rail 12. Since these bars are connected by the spring bridge portion 54 which biases them toward each other in the capsule and the terminal leg 56 is retained in the capsule 38, the spring cannot be removed from the capsule without first rotating the spring as unit counterclockwise in FIGURE 5 around the axis of bar 56. This provides a secure fastening means protecting the spring from becoming dislodged from the frame rail due to side loads, vibrations etc.

It will be understood that either terminal structure above described may be used on either the sinuous or formed wire spring structures, and the end of bar 56 in FIGURES 5–7 could be deformed as at 28 in FIGURE 2 to further aid in retaining the spring end.

In each disclosed embodiment of the invention therefore the relatively flat preformed seat spring member (the sinuous strip of FIGURES 1–4 or the formed strip of FIGURES 5–7) has special connection at each end to the hollow tubular seat structure rails.

Each of these special connections comprises two bars of the spring member adjacent the end and extending transversely of the flat spring member and mounted in special rail structure. This rail structure comprises a capsule wherein the rail surface is depressed on opposite sides of a bridge to receive and retain the transverse end bar of the spring strip and an angularly inwardly displaced surface depression to seat in load bearing engagement the other transverse bar of the special connection. As indicated in the illustrated embodiments these transverse bars may be the two transverse end bars next to each other, or may constitute the end transfer bar and one of the other adjacent transverse bars.

Once the flat spring member has its end mounted on the tubular rail as herein disclosed the main load force will be essentially absorbed and applied to the rail in the bearing engagement zone between the inwardly disposed rail depression, such as that at 46, with little or no load forces applied to the sheared capsule retainer connection to the end of the spring member.

A considerable advantage of the invention is that the cross sectional area of the tubular rail is not materially changed by the forming of the special retaining capsule and the depressions, and thus there is no removed metal and the designed strength of the tubular section will be essentially maintained at all points.

The present invention may be embodied in other forms without departing from the spirit and essential characteristics thereof, therefore, the present embodiments are to be considered in all respects as illustrative only and not restrictive the scope of the invention being indicated by the appended claims rather than by the foregoing description.

What is claimed and desired to be secured by Letters Patent is:

1. In an end connection between a preformed wire seat spring strip member and a hollow tubular seat frame member, means forming a spring end retainer connection in a wall of the seat frame member and cooperating means disposed on the seat frame member in angularly displaced relation toward the interior of the seat frame providing a load bearing seat for said spring member on said frame member.

2. In the end connection defined in claim 1, said retainer connection comprising spaced surface depressions in the wall of said seat frame member connected by a bridge lying in the contour of the remainder of the frame member wall, and a transverse terminal bar on the spring end axially inserted into said depressions beneath the bridge.

3. In the end connections defined in claim 1, said load bearing seat comprising a longitudinal surface depression in the wall of said seat frame member pivotally receiving an adjacent transverse bar of said spring member.

4. In the end connection defined in claim 1, said spring end having two adjacent transverse bars disposed respectively in frame member surface depressions at said retainer connection and load bearing seat respectively.

5. In a seat assembly having a hollow tubular frame rail for mounting the ends of side by side preformed wire strips of the type having transverse bars longitudinally connected at opposite ends, each of said end mountings comprising angularly displaced surface depression means on said rail respectively receiving and retaining the endmost transverse bar and providing a load bearing seat for an adjacent transverse bar.

6. In the seat assembly defined in claim 5, said depression means being about 90° apart.

7. In the seat assembly defined in claim 5, said depression means at the retainer connection comprising axially spaced depressions formed by inward deformation of the rail wall at opposite sides of parallel transverse wall slits.

8. In the seat assembly defined in claim 7, each of said axially spaced depressions comprising a laterally continuous rail wall portion consisting of relatively inclined sections intersecting within the frame member.

9. In the seat assembly defined in claim 8, said intersection of the inclined surfaces being offset from the axis of the frame rail toward the interior of the seat frame.

10. In a seat assembly, a hollow tubular rail having circumferentially spaced depressed surface regions, one of said regions comprising axially spaced depressions in the tube surface that are formed by transversely slitting the tube surface at two adjacent axial regions and bending the tube wall inwardly at each slit leaving the undeformed tube wall bridging the depressed region, and a flat preformed wire spring strip having a transverse end portion retained within said axially spaced depressions extending axially of said rail beneath said bridge and an adjacent transverse portion seated on the rail in the other depressed region.

11. In the seat assembly defined in claim 10, the end of said spring strip within said one depressed region comprising a transverse bar formed with a deformed terminal adapted to block its axial withdrawal from said one depressed region.

12. In the seat assembly defined in claim 10, said transverse end portions of the spring strip comprising substantially parallel transverse bars resiliently connected by a substantially U-shaped loop extending over the frame between said depressed surface regions.

No references cited.

ARTHUR L. LA POINT, *Primary Examiner.*